(12) United States Patent
Sun et al.

(10) Patent No.: US 12,278,492 B1
(45) Date of Patent: Apr. 15, 2025

(54) METHOD AND SYSTEM OF SELF-ADAPTIVE SETTING OF CLOSED-LOOP PARAMETERS FOR SUPPRESSING PHOTOVOLTAIC COUPLING HARMONICS

(71) Applicant: SHANDONG UNIVERSITY, Jinan (CN)

(72) Inventors: Yuanyuan Sun, Jinan (CN); Pengbo Shan, Jinan (CN); Yahui Li, Jinan (CN); Lei Ding, Jinan (CN); Kejun Li, Jinan (CN); Kaiqi Sun, Jinan (CN); Zhijie Liu, Jinan (CN); Yirou Lai, Jinan (CN); Zhijie Ma, Jinan (CN); Qianqian Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/982,070

(22) Filed: Dec. 16, 2024

(30) Foreign Application Priority Data

Dec. 19, 2023 (CN) .......................... 202311743428.0

(51) Int. Cl.
*H02J 3/01* (2006.01)
*H02J 3/38* (2006.01)

(52) U.S. Cl.
CPC .................. *H02J 3/01* (2013.01); *H02J 3/38* (2013.01); *H02J 2203/20* (2020.01); *H02J 2300/24* (2020.01)

(58) Field of Classification Search
CPC .. H02J 3/01; H02J 3/38; H02J 2203/20; H02J 2300/24
See application file for complete search history.

(56) References Cited

FOREIGN PATENT DOCUMENTS

| CN | 105006838 A | 10/2015 |
|---|---|---|
| CN | 105006838 B | * 4/2017 |

(Continued)

OTHER PUBLICATIONS

Li, Jianwen et. al. "Gray-box Wide Frequency Domain Matrix Model of Inverter for Harmonic Degradation Mechanism Analysis and Its Solution Method" Automation of Electric Power Systems, vol. 44, No. 18, Sep. 25, 2020.

(Continued)

*Primary Examiner* — Charles Cai
(74) *Attorney, Agent, or Firm* — IPRO, PLLC (57) ABSTRACT

The present invention provides a method and system of self-adaptive setting of closed-loop parameters for suppressing PV coupling harmonics, comprising: acquiring node voltages and node currents of PV grid-connected inverters; constructing harmonic coupling admittance matrix according to the node voltages and node currents; calculating an amplitude of each element in the constructed harmonic coupling admittance matrix; screening contribution sources of coupling harmonics according to the calculated amplitude of the each element; evaluating quantitatively harmonic admittance of the PV grid-connected inverter according to screened contribution sources; and, carrying out optimization iteration for double-closed-loop PI control parameters of inverter with objective of minimizing the coupling harmonics of the PV grid-connected inverter according to results of the quantitative evaluation of the harmonic admittance, to complete self-adaptive setting of closed-loop parameters for suppressing PV coupling harmonics.

7 Claims, 5 Drawing Sheets

(56) References Cited

FOREIGN PATENT DOCUMENTS

CN        115102168 A      9/2022
WO    WO-2022027722 A1 *  2/2022    ................ H02J 3/01

OTHER PUBLICATIONS

"Sun, Ming et al. ""Output Characteristic Analysis and HarmonicSource Modeling for Grid connected PV Inverters"" Electrical Automation, vol. 42, No. 1, Jan. 30, 2020".
Zhu, Wu et al. "Harmonic Resonance Mechanism Study of Large-Scale Photovoltaic Power Plants" Electric Power, vol. 51, No. 3, Mar. 5, 2018.
Li, Yahui. "Research on Harmonic Coupling Modeling and Influence Analysis of Multiple Sources and Loads" Wanfang Paper Full Text Database, Oct. 11, 2023.
"Xu, Qingshen et al. ""A Harmonic Source Localization Method Based on Critical Admittance Screening With Adjusted Coefficient of Determination"" 2022 Asian Conference on Frontiers of Power and Energy (ACFPE), Nov. 29, 2022".

* cited by examiner

METHOD AND SYSTEM OF SELF-ADAPTIVE SETTING OF CLOSED-LOOP PARAMETERS FOR SUPPRESSING PHOTOVOLTAIC COUPLING HARMONICS

CROSS-REFERENCE TO RELATED APPLICATIONS

This application is based on a Chinese patent application with application No. 202311743428.0, filed on Dec. 19, 2023, entitled "Method and System of Self-adaptive Setting of Closed-loop Parameters for Suppressing Photovoltaic Coupling Harmonics", and claims priority to the Chinese patent application. The entire content of the Chinese patent application is hereby incorporated by reference.

TECHNICAL FIELD

The present invention belongs to the technical field of photovoltaic grid-connected inverters, and particularly relates to a method and system of self-adaptive setting of closed-loop parameters for suppressing photovoltaic coupling harmonics.

BACKGROUND

The statements in this section merely provide background information related to the present invention and are not necessarily prior art.

With a large number of distributed photovoltaic (PV) systems access, the background harmonics in distribution transformer supply zones increase significantly. Different from traditional power distribution systems, the direct current (DC) generated by the PV system needs to be transmitted to alternating-current (AC) power grid through a voltage source converter (VSC). However, the VSC will produce a large number of odd harmonics when it is affected by the background harmonics; at the same time, there is a strong coupling relationship between each of multi-order harmonics. Complex harmonics in distribution system is the challenge cannot be ignored in high quality power supply.

At present, a passive ion method is usually using to suppress the harmonics in the distribution transformer supply zones; and, installing harmonic control equipment that may be divided into passive filters, active filters, hybrid filters, etc, according to the type of equipment installed. Wherein, the passive filters are often used in scenes where harmonic problems are fixed; the active filters have better dynamic suppression effects, and the hybrid filters combining the advantages of both have emerged. However, when the large-scale distributed PV systems are continuously connected to the large-scale power grid, a type of the suppression of the harmonics in the distribution transformer supply zones is transformed from a passive type to an active type. On an ideal power supply assumption, voltage modulation compensation method and virtual admittance construction method may effectively reduce VSC output harmonic current, but cannot control response harmonic current caused by the background harmonic voltage.

The inventors found that the current research on PV harmonic suppression does not consider the coupling characteristics between multi-order harmonics, resulting in harmonic suppression as a single-target control, which cannot meet the requirements of coupling harmonic suppression when the large-scale distributed PV systems connect to the distribution transformer supply zones. And, it is more difficult to suppress the coupling harmonics generated in the distribution transformer supply zones with complex low-order background harmonics.

SUMMARY

In order to solve the above problems, the present invention provides a method and system of self-adaptive setting of closed-loop parameters for suppressing PV coupling harmonics, constructing a harmonic coupling admittance matrix of a PV grid-connected inverter to carry out harmonic admittance quantitative evaluation, setting parameters of a double-closed-loop controller with a goal of minimizing coupling harmonics, and constructing coupling virtual harmonic impedance by utilizing grid-connected current feedback and a band-pass filter, to realize a self-adaptive setting and segmented delay injection of virtual impedance, which effectively reduces the content of coupling harmonic generated by the VSC, fully suppresses multi-order coupling harmonics in grid-connected nodes of the distribution system connected to the distributed PV systems, and improves high-quality power supply level of the distribution transformer supply zones.

According to one or more embodiments, the first aspect of the present invention provides a method of self-adaptive setting of closed-loop parameters for suppressing PV coupling harmonics, which comprises the following technical solution.

The method of self-adaptive setting of closed-loop parameters for suppressing PV coupling harmonics, comprising:

acquiring, by a processor, a node voltage and a node current of a PV grid-connected inverter to be set collected by sampling device in real-time;

constructing, in the processor, a harmonic coupling admittance matrix of PV grid-connected inverter to be set according to the measured node voltage and node current;

calculating, by the processor, an amplitude of each element of the constructed harmonic coupling admittance matrix;

screening, by a band-pass filter, contribution sources of coupling harmonics generated by the PV grid-connected inverter to be set according to the calculated amplitude of the each element;

evaluating quantitatively, by the processor, a harmonic admittance of the PV grid-connected inverter to be set according to screened contribution sources;

carrying out, by the processor, an optimization iteration for parameters of double-closed-loop proportional-integral (PI) control of inverter with an objective of minimizing the coupling harmonics of the PV grid-connected inverter to be set according to results of the quantitative evaluation of the harmonic admittance, and outputting physical values of gain parameters to complete a self-adaptive setting of closed-loop parameters for suppressing PV coupling harmonics; and constructing and injecting a virtual impedance of each of the coupling harmonics into a controller of the PV grid-connected inverter to be set in a piecewise-delayed manner according to the output physical values of the gain parameters, to suppress the coupling harmonics generated by the PV grid-connected inverter to be set, to limit a distortion rate of the coupling harmonics within a predetermined threshold.

As a further technical limitation, based on actual parameters of hardware topology of converter and current controller parameters, constructing a harmonic state space model by a small signal disturbance modeling method, wherein each of elements in the model is a multi-order matrix, and an order of the multi-order matrix is a highest order of a considered harmonic; then, representing a coupling action between multiple orders by matrix convolution operation, and giving a physical meaning of the harmonic admittances to a convolution result, to form the harmonic coupling admittance matrix of the PV grid-connected inverter to be set.

As a further technical limitation, in a process of screening the contribution sources of the coupling harmonics generated by the PV grid-connected inverter to be set, determining a relationship between control variables and an amplitude of the harmonic coupling admittance by comparing changes of the each element in the harmonic coupling admittance matrix before and after different controller parameters are changed, that is, determining the harmonic admittance amplitude change ratio (also known as a Harmonic Change Error, HCE), to identify and screen the contribution sources of the coupling harmonics generated by the PV grid-connected inverter to be set.

Further, the HCE is a ratio of different between a harmonic coupling admittance value after the different controller parameters are changed and an original admittance value of preset parameters to the original admittance value of the preset parameters, i.e., $HCE=(Y_{x,y}^{II}-Y_{x,y}^{I})/Y_{x,y}^{I}\times 100\%$; where, $Y_{x,y}^{I}$ is the original admittance value of the preset parameters, and $Y_{x,y}^{II}$ is the admittance value after the preset parameters are changed.

Furthermore, when the HCE exceeds an upper-limit of a threshold range, a controlled variable of the controller is a strong coupled variable;

when the HCE is within threshold range, the controlled variable of the controller is a coupled variable; and when the HCE does not exceed a lower-limit of the threshold range, the controlled variable of the controller is an uncoupled variable.

As a further technical limitation, in a process of the optimization iteration of the double-closed-loop PI control parameters of inverter, iterating the controller parameters with a small step increase or decrease based on the current controller parameters, and determining whether the controller parameters continue to increase or decrease by using harmonic analysis results in a steady state as reference, until an inflection point of harmonic distortion rate occurs.

Furthermore, after the iteration of the closed-loop parameters of the PI controller is completed, based on an analysis result of harmonic content in a current PV grid-connected current, extracting a harmonic content to be further eliminated by a proportional resonance controller, superimposing extracted harmonic content on a modulation signal of controller after being multiplied by a virtual harmonic gain coefficient, to construct an equivalent harmonic impedance; meanwhile, an iterative computation of the virtual harmonic gain coefficient is also needed, taking a minimum distortion rate of the coupled harmonics as a target, starting iterating from the (6k−1)th harmonic and ending with the (6k+1)th harmonic in the same iterative mode as the closed-loop parameter optimization, until the distortion rate of a target harmonic to be suppressed is lower than 0.5%, stopping the iterative computation, and retaining a current gain value.

According to one or more embodiments, the second aspect of the present invention provides a system of self-adaptive setting of closed-loop parameters for suppressing PV coupling harmonics, which comprises the following technical solution.

The system of self-adaptive setting of closed-loop parameters for suppressing PV coupling harmonics, comprising:

an acquisition module, configured to acquire a node voltage and a node current of a PV grid-connected inverter to be set collected by a sampling device in real-time;

a construction module, configured to construct a harmonic coupling admittance matrix of the PV grid-connected inverter to be set according to the acquired node voltage and node current;

a calculation module, configured to calculate an amplitude of each element of the constructed harmonic coupling admittance matrix;

a screening module, configured to screen contribution sources of coupling harmonics generated by the PV grid-connected inverter to be set according to the calculated amplitude of the each element;

an evaluation module, configured to quantitatively evaluate a harmonic admittance of the PV grid-connected inverter to be set according to screened contribution sources; and a setting module, configured to perform an optimization iteration for parameters of double-closed-loop proportional-integral (PI) control of inverter with an objective of minimizing the coupling harmonics of the PV grid-connected inverter to be set according to results of the quantitative evaluation of the harmonic admittance, and outputting physical values of gain parameters to complete a self-adaptive setting of closed-loop parameters for suppressing PV coupling harmonics;

wherein a virtual impedance of each of the coupling harmonics is injected into a controller of the PV grid-connected inverter to be set in a piecewise-delayed manner according to the output physical values of the gain parameters, to suppress the coupling harmonics generated by the PV grid-connected inverter to be set, to limit a distortion rate of the coupling harmonics within a predetermined threshold.

According to one or more embodiments, the third aspect of the present invention provides a non-transitory computer-readable storage medium, which comprises the following technical solution.

The non-transitory computer-readable storage medium, having a program stored thereon; wherein, when the program is executed by a processor, implements the steps of the method of self-adaptive setting of closed-loop parameters for suppressing PV coupling harmonics according to the first aspect of the present invention.

According to one or more embodiments, the fourth aspect of the present invention provides an electronic device, which comprises the following technical solutions.

The electronic device, comprising a memory, a processor, and a program stored in the memory and operable on the processor; wherein, when the program is executed by the processor, implements the steps of the method of self-adaptive setting of closed-loop parameters for suppressing PV coupling harmonics according to the first aspect of the present invention.

Compared with the prior art, the present invention has the beneficial effects that:

According to the present invention, a coupling harmonic admittance quantitative evaluation method is adopted, which breaks through the limitation of single-order harmonic external characteristic modeling, can realize the evaluation of coupling harmonic dominant factors for any type and class of VSC by combining the influence of topology structure and control parameters, and has extremely strong adaptability and universality in the design of power distribution system scenes; combined with the voltage and current data monitored from grid-connected point of the distributed PV system, the parameters are optimized and set by the controller to achieve the minimum coupling harmonics, fast iteration speed and strong robustness of VSC output current in the background harmonic scene; by analyzing the influence of harmonic virtual impedance on each element of VSC harmonic coupling admittance matrix, a new index of coupling harmonic virtual impedance is constructed, and through parameter setting of coupling harmonic virtual impedance, combined with multi-order signal subsection delay injection method, the technical blank of coupling harmonic suppression is made up in scenes with background harmonics. Compared with traditional methods, the robustness and stability of the method proposed by the present invention are stronger, and it can adapt to different types of PV grid-connected scenes.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The embodiments and the features of the embodiments in the present invention may be combined with each other without conflict.

Embodiment 1

The present embodiment proposes a method of self-adaptive setting of closed-loop parameters for suppressing PV coupling harmonic.

Figure 1:
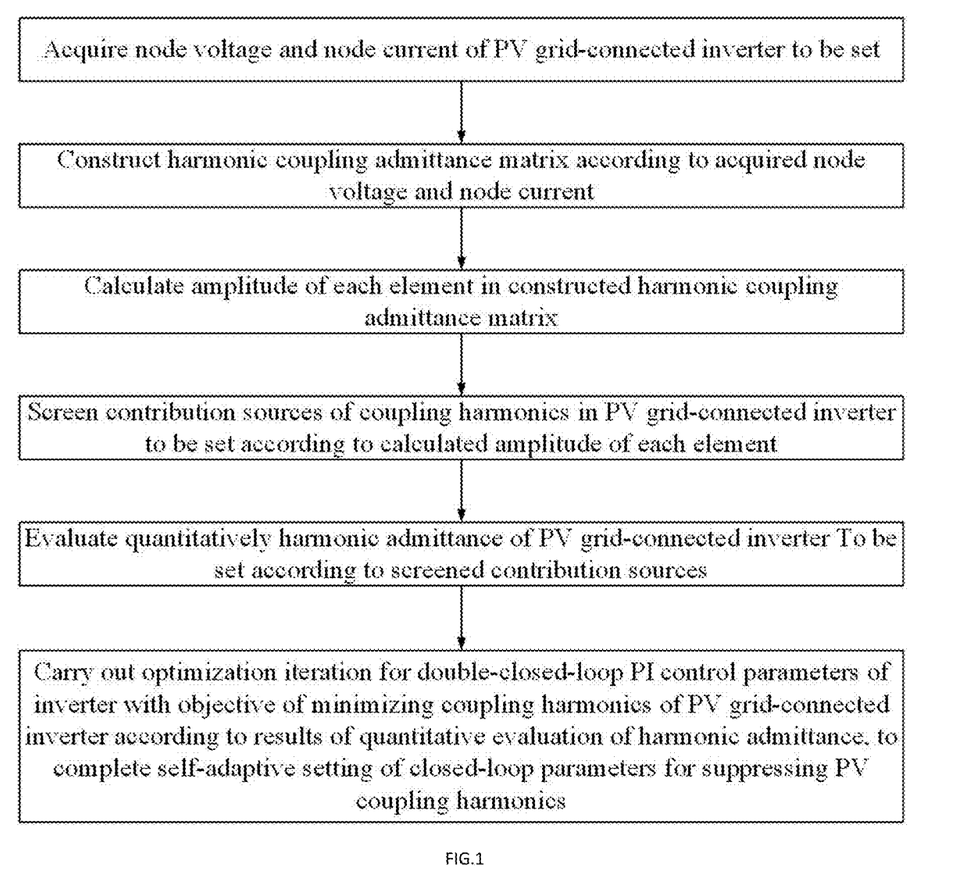
FIG. 1 is a flowchart of a self-adaptive setting method of closed-loop parameters of self-adaptive setting of closed-loop parameters for suppressing PV coupling harmonics according to Embodiment 1 of the present invention.

As shown in FIG. 1, a method of self-adaptive setting of closed-loop parameters for suppressing PV coupling harmonics, comprising:

acquiring, by a processor, a real-time node voltage and a real-time node current of a PV grid-connected inverter to be set;

constructing, by the processor, a harmonic coupling admittance matrix of the PV grid-connected inverter to be set according to the acquired real-time node voltage and real-time node current;

calculating, by the processor, an amplitude of each element of the constructed harmonic coupling admittance matrix;

screening, by a band-pass filter, contribution sources of coupling harmonics generated by the PV grid-connected inverter to be set according to the calculated amplitude of the each element;

evaluating quantitatively, by the processor, a harmonic admittance of the PV grid-connected inverter to be set according to screened contribution sources; and carrying out, by the processor, an optimization iteration for parameters of double-closed-loop proportional-integral (PI) control of inverter with an objective of minimizing the coupling harmonics of the PV grid-connected inverter to be set according to results of the quantitative evaluation of the harmonic admittance, and outputting gain parameters to complete self-adaptive setting of closed-loop parameters for suppressing PV coupling harmonics.

Figure 2:
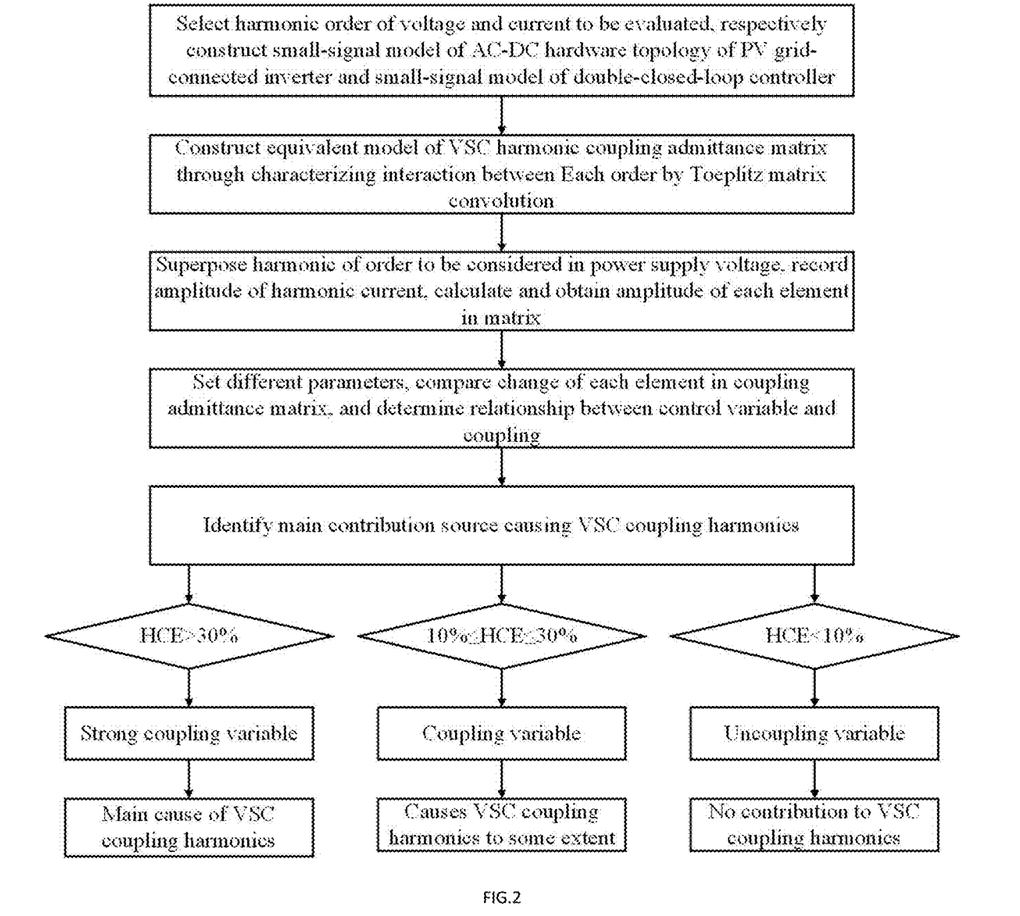
FIG. 2 is a flowchart of a method for quantitatively evaluating a VSC equivalent harmonic admittance based on double-checking of topology-control small-signal modeling and voltage sweep according to the Embodiment 1 of the present invention.

In the present embodiment, the quantitative evaluation of the harmonic admittance of the PV grid-connected inverter is performed by adopting a double check of topology-control-based small-signal modeling and voltage sweep, and the specific flow is shown in FIG. 2, comprising:

arbitrarily selecting an order h of the coupling harmonic to be evaluated, based on voltage and current data collected by a measuring apparatus of PV grid-connected inverter at a current time, constructing an equivalent model of harmonic coupling admittance matrix of topology-control-based small-signal of the PV inverter by using current inductance and capacitance of inverter and controller parameters as small-signal variables. In other words, a space model of harmonic state is construct by a small-signal disturbance modeling mode based on actual parameters of hardware topology of converter and current control parameters, wherein each element in the model is a multi-order matrix, and an order of each the multi-order matrix is a highest order of the harmonic to be considered; a coupling action among multi-orders is characterized by matrix convolution operation, physical meaning of harmonic admittance of convolution results is endowed, and a harmonic coupling admittance matrix of the PV grid-connected inverter is formed;

adjusting PI parameters of controller in a stable range, and constructing the evaluation index of coupling harmonic contribution according to the change rate of equivalent admittance amplitude of each order of the harmonic; and identifying the main source causing harmonic coupling phenomenon of PV grid-connected inverter according to the criterions and conditions met by the evaluation index, then operation of the quantitative evaluation of the coupling admittance is finished.

In the present embodiment, the grid-connected monitoring data of the PV grid-connected inverter are recorded by the power quality sampling device installed at an outlet of a LCL filter (Low-Pass Filter with Capacitor and Inductor) of the inverter, and the monitoring data comprise three-phase grid-connected current data of the PV grid-connected inverter, three-phase voltage data at the current grid-connected node, and simultaneously comprise Fourier decomposition results of the voltage and current data.

As one or more embodiments, a specific process for quantitatively evaluating VSC equivalent harmonic admittance based on the double check of topology-control small-signal modeling and voltage sweep, comprising:

(i) arbitrarily selecting the h order of the coupling harmonic to be evaluated, based on voltage and current data collected by the sampling device of the PV grid-connected inverter at that time, constructing the equivalent model of the harmonic coupling admittance matrix of the topological-control small-signal of the PV grid-connected inverter by taking current inductance and capacitance of inverter and current controller parameters as small-signal variables;

sampling the grid-connected current harmonic of each order $i_{g,x}$ and each grid-connected voltage harmonic of each order $u_{g,x}$ as scalars, then the equivalent harmonic admittance $\tilde{Y}_{m,n}$ is:

$$\begin{bmatrix} i_{g,1} \\ \vdots \\ i_{g,x} \\ \vdots \\ i_{g,h} \end{bmatrix} = \begin{bmatrix} Y_{1,1} & \cdots & Y_{x,1} & \cdots & Y_{h,1} \\ \vdots & \ddots & \vdots & \ddots & \vdots \\ Y_{1,x} & \cdots & Y_{x,x} & \cdots & Y_{h,x} \\ \vdots & \ddots & \vdots & \ddots & \vdots \\ Y_{1,h} & \cdots & Y_{x,h} & \cdots & Y_{h,h} \end{bmatrix} \begin{bmatrix} u_{g,1} \\ \vdots \\ u_{g,x} \\ \vdots \\ u_{g,h} \end{bmatrix};$$

Figure 3:
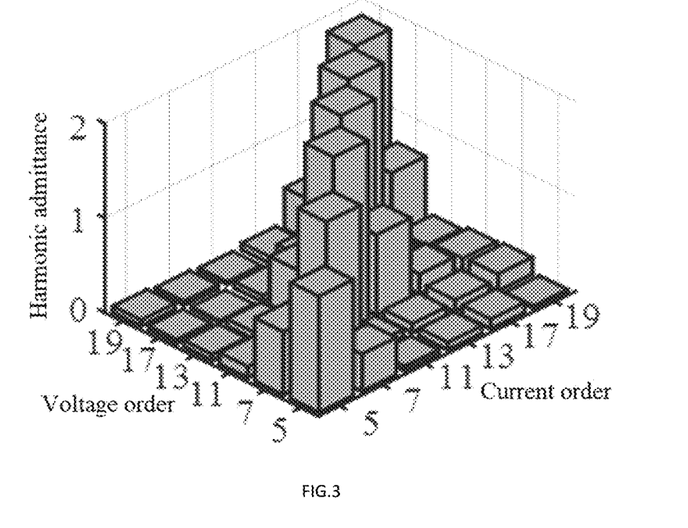
FIG. 3 is a schematic diagram of an equivalent model of a VSC harmonic coupling admittance matrix after double checked by the small-signal model and the voltage sweep according to the Embodiment 1 of the present invention.

(2) constructing the harmonic voltage sweep order experimental condition by superposing the harmonic voltage of the order to be considered in the power supply voltage; recording the amplitudes of harmonic currents of the each order in ideal power supply and the order sweep experiment, subtracting them and compare them with harmonic voltages to obtain the amplitudes of each element in the h-order harmonic coupling admittance matrix; and the equivalent model of the VSC harmonic coupling admittance matrix after double check of small-signal model and voltage sweep, is shown in FIG. 3.

(3) setting different PI controller parameters, and determining a relationship between control variables and an amplitude of the harmonic coupling admittance by comparing changes of the each element in the harmonic coupling admittance matrix before and after different controller parameters are changed, that is HCE, for identifying and screening the contribution sources of the coupling harmonics generated by the PV grid-connected inverter;

the HCE is a ratio of different between a harmonic coupling admittance value after the different controller parameters are changed and an original admittance value of preset parameters to the original admittance value of the preset parameters, i.e., HCE=$(Y_{x,y}''-Y_{x,y}')/Y_{x,y}'\times100\%$; where, $Y_{x,y}'$ is the original admittance value of the preset parameters, and $Y_{x,y}''$ is the admittance value after the preset parameters are changed.

Identifying the main contribution sources of the VSC coupling harmonics according to the variation trend of the each element in the VSC coupling harmonic admittance matrix under different parameter combinations, wherein the proportional coefficient $K_{pi}$ in the current-loop PI controller has the greatest influence on the coupling harmonic admittance.

Therefore, taking the h-th harmonic current and h-th harmonic voltage at the distributed PV node concerned as variables and the change rate of the harmonic admittance amplitude as the evaluation index, then the criteria can be refined into three categories:

when the HCE exceeds an upper-limit of a threshold range, a controlled variable of the controller is a strong coupled variable;

when the HCE is within a threshold range, the controlled variable of the controller is a coupled variable; and when the HCE does not exceed a lower-limit of the threshold range, the controlled variable of the controller is an uncoupled variable.

In the present embodiment, when HCE>30%, the controlled variable is the strong coupling variable, which is the main cause of the VSC coupling harmonics;

when 10%≤HCE≤30%, the controlled variable is the coupled variable, which causes the VSC coupling harmonics to some extent; and when HCE<10%, the controlled variable is the uncoupled variable and have no contribution to the VSC coupling harmonics.

So far, the operation of the quantitative evaluation of the h-th harmonic coupling admittance matrix of the PV grid-connected inverter is completed.

The evaluation method in the present embodiment is not limited by the type, topological structure, control strategy and parameters of the PV grid-connected inverter, and can realize the evaluation of multi-order coupling harmonic admittance based on grid-connected voltage and current data, and has extremely strong adaptability and universality in practical engineering; and, the problem that the distributed PV multi-order coupling equivalent harmonic admittance is difficult to estimate is solved by combining distributed PV grid-connected point sampling data, and the method is simple and practical.

In the present embodiment, after the quantitative evaluation of harmonic admittance is completed, the optimization iteration of double-closed-loop PI control parameters of inverter is performed with the minimum coupling harmonic of the PV grid-connected inverter as the objective, to complete the self-adaptive setting of closed-loop parameters for suppressing PV coupling harmonics.

Figure 4:
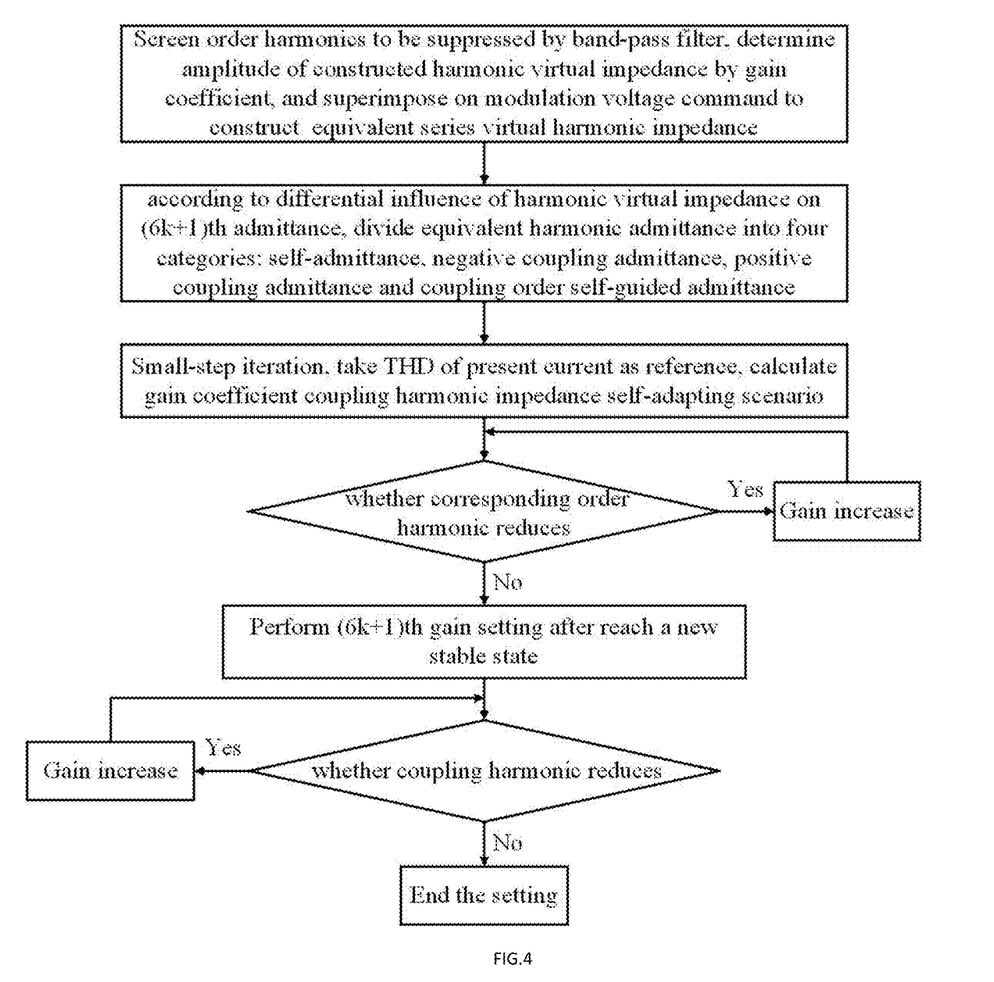
FIG. 4 is a flowchart of self-adaptive setting of virtual impedance of the VSC coupling harmonics according to the Embodiment 1 of the present invention.

In the present embodiment, a process for self-adaptive setting the VSC coupling harmonic virtual impedance, as shown in FIG. 4, comprising:

(1) filtering orders of harmonics to be suppressed by a band-pass filter, determining the amplitude of the constructed coupling harmonic virtual impedance by a gain coefficient, and superimposing the amplitude signal on a modulation voltage command to construct the coupling harmonic virtual impedance;

(2) according to the different influence tendency of single harmonic virtual impedance signal on (6k−1)th and (6k+1)th admittance, dividing the equivalent harmonic admittance into four categories: self-admittance, negative coupling admittance, positive coupling admittance and coupling order self-guided admittance, comprising:

$$\begin{cases} Y_{m,n} = \begin{bmatrix} \dfrac{Y_{n,n}}{1+Y_{n,n}(Z^n_{SHC}+Z^m_{CFSHC})} & \dfrac{Y_{n,m}}{1+Y_{n,m}(Z^n_{NCHC}+Z^m_{NCHC})} \\ \dfrac{Y_{n,n}}{1+Y_{m,n}(Z^n_{PCHC}+Z^m_{PCHC})} & \dfrac{Y_{n,n}}{1+Y_{m,m}(Z^n_{CFSHC}+Z^m_{SHC})} \end{bmatrix} \\ n = (5, 11, \ldots), m = n+2 \end{cases};$$

where, $Z_{SHC}{}^n$ is the self-admittance, $Z_{CESHC}{}^m$ is the coupling order self-admittance, $Z_{PCHC}{}^n$ is the negative coupling admittance, and $Z_{PCHC}{}^m$ is positive coupling admittance.

(3) setting the virtual gain from the (6k−1)th harmonic to the (6k+1)th harmonic in coupling order; wherein, as an example, taking k=1, first setting the gain corresponding to 5th harmonic, and then setting the gain corresponding to 7th harmonic, wherein the amplitude of virtual gain represents the size of the virtual impedance constructed in VSC external characteristics; and, calculating the gain coefficient that minimizes the content of coupling harmonic in current power supply scenario through small-step gain coefficient iteration and taking total harmonic distortion (THD) result of a present current as reference; and after the iteration of the closed-loop parameters of the PI controller, extracting harmonic component to be further eliminated by a proportional resonance controller based on the harmonic content analysis result in the present PV grid-connected current, and superimposing the extracted harmonic component on a modulation signal of the controller after being multiplied by a virtual harmonic gain coefficient, to construct the equivalent harmonic impedance. Meanwhile, there also needs an iterative calculation on virtual harmonic gain coefficient, which comprise taking the minimum distortion rate of coupled harmonics as the target, starting the iterative from the (6k−1)th harmonic and ending the iterative with the (6k+1)th harmonic in the same iterative mode as the optimization of the closed-loop parameters, stopping the iterative calculation until the target harmonic distortion rate is suppressed to lower than 0.5%, and retaining the current gain value.

(4) After the gain coefficient is determined, the amplitude of $Z_{h,series}$ is also determined accordingly, but the signals for each order should be injected to the controller in sections to avoid instability of system control. The meaning of the self-adaptive setting is embodied in that the final gain parameter is an optimal solution which makes VSC generating coupling harmonics lower than 0.5% based on the current power supply condition (i.e., it defaults to not changing in the short term), and the setting and injection for next order will be carried out after the system reaches the new steady state again. The orderly setting and orderly injection of multi-order signals show that the proposed method has strong adaptability. Wherein, a limiting condition, for injecting the virtual of each harmonic into the VSC controller in a piecewise-delayed manner and carrying out the setting and injection of the harmonic impedance of next order when the grid-connected current reaches the new steady state, is as follows:

$$\begin{cases} Z^{dq}_{h,series} = \sum_h Z_{h,series} e^{-sT_h} \\ \Delta m_{d,q} = Z^{dq}_{h,series} + \Delta \tilde{m}_{d,q} \subseteq \left(-\dfrac{u_{dc}}{2}, \dfrac{u_{dc}}{2}\right) \end{cases};$$

where, $Z_{h,series}{}^{dq}$ is the sum of multiple the constructed harmonic virtual impedance signals, $Z_{h,series}$ is the h-th harmonic virtual impedance signal, $\Delta \tilde{m}_{d,q}$ is the dq-axis modulated voltage signal before the virtual impedance signal is superimposed, $\Delta m_{d,q}$ is the dq-axis modulated voltage signal before the virtual impedance signal is superimposed, and $u_{dc}$ is the DC side voltage of the PV grid-connected inverter.

According to the present embodiment, the proposed quantitative evaluation method of coupling harmonic admittance breaks through the limitation of single-order harmonic external characteristic modeling, can realize the evaluation of coupling harmonic dominant factors for any type and class of VSC by combining the influence of topology structure and control parameters, and has extremely strong adaptability and universality in the design of power distribution system scenes; combined with the voltage and current data monitored from grid-connected point of the distributed PV system, the parameters are optimized and set by the controller to achieve the minimum coupling harmonics, fast iteration speed and strong robustness of VSC output current in the background harmonic scene; by analyzing the influence of harmonic virtual impedance on each element of VSC harmonic coupling admittance matrix, a new index of coupling harmonic virtual impedance is constructed, and through parameter setting of coupling harmonic virtual impedance, combined with multi-order signal subsection delay injection method, the technical blank of coupling harmonic suppression is made up in scenes with background harmonics. Compared with traditional methods, the robustness and stability of the method proposed by the present invention are stronger, and it can adapt to different types of PV grid-connected scenes.

Embodiment 2

The present embodiment provides a system of self-adaptive setting of closed-loop parameters for suppressing PV coupling harmonics.

Figure 5:
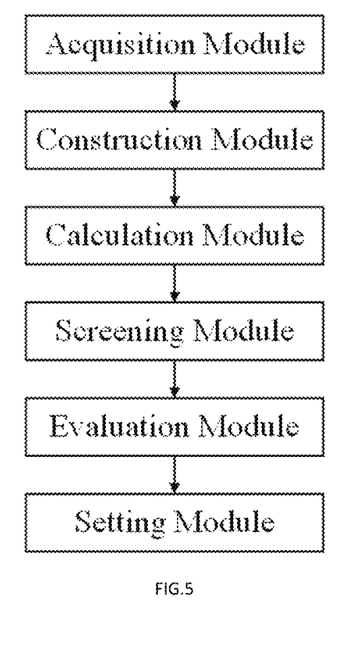
FIG. 5 is a structural block diagram of a self-adaptive setting system of closed-loop parameters of self-adaptive setting of closed-loop parameters for suppressing PV coupling harmonics according to Embodiment 2 of the present invention.

As shown in FIG. 5, the system of self-adaptive setting of closed-loop parameters for suppressing PV coupling harmonics, comprising:

an acquisition module, configured to acquire a node voltage and a node current of a PV grid-connected inverter to be set collected by a sampling device in real-time;

a construction module, configured to construct a harmonic coupling admittance matrix of the PV grid-connected inverter to be set according to the acquired node voltage and node current;

a calculation module, configured to calculate an amplitude of each element of the constructed harmonic coupling admittance matrix;

a screening module, configured to screen contribution sources of coupling harmonics generated by the PV grid-connected inverter to be set according to the calculated amplitude of the each element;

an evaluation module, configured to quantitatively evaluate a harmonic admittance of the PV grid-connected inverter to be set according to screened contribution sources; and a setting module, configured to perform an optimization iteration for parameters of double-closed-loop proportional-integral (PI) control of inverter with an objective of minimizing the coupling harmonics of the PV grid-connected inverter to be set according to results of the quantitative evaluation of the harmonic admittance, and outputting gain parameters to complete a self-adaptive setting of closed-loop parameters for suppressing PV coupling harmonics;

The detailed steps of the present embodiment are the same as the method of self-adaptive setting of closed-loop parameters for suppressing PV coupling harmonics provided in Embodiment 1, and are not repeated here.

Embodiment 3

The present embodiment provides a non-transitory computer-readable storage medium, wherein,
the non-transitory computer-readable storage medium, having a program stored thereon; wherein, when the program is executed by a processor, implements the steps of the method of self-adaptive setting of closed-loop parameters for suppressing PV coupling harmonics according to the Embodiment 1 of the present invention.

Embodiment 4

The present embodiment provides an electronic device, wherein, the electronic device, comprising a memory, a processor, and a program stored in the memory and operable on the processor; wherein, when the steps of the method of self-adaptive setting of closed-loop parameters for suppressing PV coupling harmonics according to the Embodiment 1 of the present invention.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method of self-adaptive setting of closed-loop parameters for suppressing photovoltaic (PV) coupling harmonics, comprising:
acquiring a node voltage and a node current of a PV grid-connected inverter to be set;
constructing a harmonic coupling admittance matrix of the PV grid-connected inverter to be set according to the acquired node voltage and node current;
calculating an amplitude of each element of the constructed harmonic coupling admittance matrix;
screening contribution sources of coupling harmonics generated by the PV grid-connected inverter to be set according to the calculated amplitude of the each element;
evaluating quantitatively a harmonic admittance of the PV grid-connected inverter to be set according to screened contribution sources; and
carrying out an optimization iteration for parameters of double-closed-loop proportional-integral (PI) control of inverter with an objective of minimizing the coupling harmonics of the PV grid-connected inverter to be set according to results of the quantitative evaluation of the harmonic admittance, to complete self-adaptive setting of closed-loop parameters for suppressing PV coupling harmonics;
wherein, in a process of screening the contribution sources of the coupling harmonics generated by the PV grid-connected inverter to be set, determining a relationship between control variables and an amplitude of the harmonic coupling admittance by comparing changes of the each element in the harmonic coupling admittance matrix before and after different controller parameters are changed, wherein determining a harmonic admittance amplitude change ratio (hereinafter referred to as HCE) to identify and screen the contribution sources of the coupling harmonics generated by the PV grid-connected inverter to be set; wherein,
the HCE is a ratio of difference between a harmonic coupling admittance value after the different controller parameters are changed and an original admittance value of preset parameters to the original admittance value of the preset parameters, $HCE=(Y_{x,y}{}^{II}-Y_{x,y}{}^{I})/Y_{x,y}{}^{I} \times 100\%$; where, $Y_{x,y}{}^{I}$ is the original admittance value of the preset parameters, and $Y_{x,y}{}^{II}$ is the admittance value after the preset parameters are changed; and
in response to the HCE exceeding an upper-limit of a threshold range, a controlled variable of the controller is a strong coupled variable;
in response to the HCE being within the threshold range, the controlled variable of the controller is a coupled variable; and
in response to the HCE not exceeding a lower-limit of the threshold range, the controlled variable of the controller is an uncoupled variable.

2. The method according to claim 1, wherein based on actual parameters of hardware topology of converter and current controller parameters, constructing a harmonic state space model by a small signal disturbance modeling method, wherein each of elements in the model is a multi-order matrix, and an order of the multi-order matrix is a highest order of a considered harmonic; then, representing a coupling action between multiple orders by matrix convolution operation, and giving a physical meaning of the harmonic admittances to a convolution result, to form the harmonic coupling admittance matrix of the PV grid-connected inverter to be set.

3. The method according to claim 1, wherein in a process of the optimization iteration of the double-closed-loop PI control parameters of inverter, iterating the controller parameters with a small step increase or decrease based on the current controller parameters, and determining whether the controller parameters continue to increase or decrease by using harmonic analysis results in a steady state as reference, until an inflection point of harmonic distortion rate occurs.

4. The method according claim 3, wherein after the iteration of the closed-loop parameters of the PI controller is completed, based on an analysis result of harmonic content in a current PV grid-connected current, extracting a harmonic content to be further eliminated by a proportional resonance controller, superimposing extracted harmonic content on a modulation signal of controller after being multiplied by a virtual harmonic gain coefficient, to construct an equivalent harmonic impedance; meanwhile, an iterative computation of the virtual harmonic gain coefficient is also needed, taking a minimum distortion rate of the coupled harmonics as a target, starting iterating from the (6k−1)th harmonic and ending with the (6k+1)th harmonic in the same iterative mode as the closed-loop parameter optimization, until the distortion rate of a target harmonic to be suppressed is lower than 0.5%, stopping the iterative computation, and retaining a current gain value.

5. A system of self-adaptive setting of closed-loop parameters for suppressing PV coupling harmonics, comprising:
an acquisition module, configured to acquire a node voltage and a node current of a PV grid-connected inverter to be set;
a construction module, configured to construct a harmonic coupling admittance matrix of the PV grid-connected inverter to be set according to the acquired node voltage and node current;
a calculation module, configured to calculate an amplitude of each element of the constructed harmonic coupling admittance matrix;
a screening module, configured to screen contribution sources of coupling harmonics generated by the PV grid-connected inverter to be set according to the calculated amplitude of the each element;
an evaluation module, configured to quantitatively evaluate a harmonic admittance of the PV grid-connected inverter to be set according to screened contribution sources; and
a setting module, configured to perform an optimization iteration for parameters of double-closed-loop proportional-integral (PI) control of inverter with an objective of minimizing the coupling harmonics of the PV grid-connected inverter to be set according to results of the quantitative evaluation of the harmonic admittance, to complete a self-adaptive setting of closed-loop parameters for suppressing PV coupling harmonics;
wherein, in a process of screening the contribution sources of the coupling harmonics generated by the PV grid-connected inverter to be set, determining a relationship between control variables and an amplitude of the harmonic coupling admittance by comparing changes of the each element in the harmonic coupling admittance matrix before and after different controller parameters are changed, wherein determining a harmonic admittance amplitude change ratio (hereinafter referred to as HCE), to identify and screen the contribution sources of the coupling harmonics generated by the PV grid-connected inverter to be set; wherein,
the HCE is a ratio of difference between a harmonic coupling admittance value after the different controller parameters are changed and an original admittance value of preset parameters to the original admittance value of the preset parameters, $HCE=(Y_{x,y}^{II}-Y_{x,y}^{I})/Y_{x,y}^{I} \times 100\%$; where, $Y_{x,y}^{I}$ is the original admittance value of the preset parameters, and $Y_{x,y}^{II}$ is the admittance value after the preset parameters are changed; and
when the HCE exceeds an upper-limit of a threshold range, a controlled variable of the controller is a strong coupled variable;
when the HCE is within the threshold range, the controlled variable of the controller is a coupled variable; and
when the HCE does not exceed a lower-limit of the threshold range, the controlled variable of the controller is an uncoupled variable.

6. A non-transitory computer-readable storage medium, having a program stored thereon; wherein, when the program is executed by a processor, implements steps of a method according to claim 1.

7. An electronic device, comprising a memory, a processor, and a program stored in the memory and operable on the processor; wherein, when the program is executed by the processor, implements steps of a method according to claim 1.

* * * * *